United States Patent
Shin et al.

(10) Patent No.: US 12,510,701 B2
(45) Date of Patent: Dec. 30, 2025

(54) OPTICAL LAMINATE AND OPTICAL DISPLAY APPARATUS COMPRISING THE SAME

(71) Applicant: SAMSUNG SDI CO., LTD., Yongin-si (KR)

(72) Inventors: Seung Mi Shin, Suwon-si (KR); Wan Taek Hong, Suwon-si (KR); Seong Hoon Lee, Suwon-si (KR); Seon Gyeong Jeong, Suwon-si (KR); Boem Deok Lee, Suwon-si (KR); Bong Choon Kim, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 608 days.

(21) Appl. No.: 17/873,049

(22) Filed: Jul. 25, 2022

(65) Prior Publication Data

US 2023/0053212 A1  Feb. 16, 2023

(30) Foreign Application Priority Data

Jul. 28, 2021 (KR) .................. 10-2021-0099112

(51) Int. Cl.
*G02B 5/30* (2006.01)
*G02F 1/1335* (2006.01)
*G02F 1/13363* (2006.01)

(52) U.S. Cl.
CPC ......... *G02B 5/3083* (2013.01); *G02B 5/3025* (2013.01); *G02F 1/133531* (2021.01);
(Continued)

(58) Field of Classification Search
None
See application file for complete search history.

(56) References Cited

U.S. PATENT DOCUMENTS

2006/0119775 A1\*  6/2006  Nakata .................. G02F 1/1335
                                                           349/119
2018/0329124 A1   11/2018  Iida
(Continued)

FOREIGN PATENT DOCUMENTS

JP   2006-251659 A    9/2006
KR   10-2020-0042296 A  4/2020
(Continued)

OTHER PUBLICATIONS

Korean Office Action dated Jun. 24, 2024 issued in corresponding Korean Patent Application No. 10-2021-0099112 (5 pages).
(Continued)

*Primary Examiner* — Shan Liu
(74) *Attorney, Agent, or Firm* — Ricky Lam

(57) ABSTRACT

Disclosed are an optical laminate and an optical display apparatus including the same. The optical laminate includes: a polarizer; and a retardation layer stacked on a light incidence surface of the polarizer, wherein the retardation layer includes a positive C layer, the positive C layer having an in-plane retardation of 0 nm to 30 nm and an out-of-plane retardation of −50 nm to −15 nm at a wavelength of 550 nm, and the in-plane retardation of the positive C layer at a wavelength of 550 nm and an absolute value of a tilted angle of a slow axis of the positive C layer with respect to a light absorption axis of the polarizer satisfy Relation 1.

11 Claims, 1 Drawing Sheet

(52) U.S. Cl.
CPC .... *G02F 1/133638* (2021.01); *G02F 2413/01* (2013.01); *G02F 2413/08* (2013.01); *G02F 2413/13* (2013.01)

(56) References Cited

U.S. PATENT DOCUMENTS

| | | |
|---|---|---|
| 2019/0288240 A1 | 9/2019 | Atsumi et al. |
| 2020/0355964 A1 | 11/2020 | Yonezawa et al. |
| 2021/0260851 A1* | 8/2021 | Tomohisa .............. C09J 133/04 |
| 2021/0397043 A1 | 12/2021 | Jo et al. |

FOREIGN PATENT DOCUMENTS

| | | | |
|---|---|---|---|
| KR | 20200042296 A | * | 4/2020 |
| KR | 10-2020-0081155 A | | 7/2020 |
| KR | 10-2021-0156688 A | | 12/2021 |

OTHER PUBLICATIONS

Taiwanese Office Action dated Jun. 27, 2023 issued in Taiwanese Patent Application No. 111127859 (4 pages).

Korean Notice of Allowance dated Feb. 26, 2025, corresponding to Korean Patent Application No. 10-2021-0099112 (7 pages).

* cited by examiner

OPTICAL LAMINATE AND OPTICAL DISPLAY APPARATUS COMPRISING THE SAME

CROSS-REFERENCE TO RELATED APPLICATION

This application claims priority to and the benefit of Korean Patent Application No. 10-2021-0099112, filed on Jul. 28, 2021 in the Korean Intellectual Property Office, the entire disclosure of which is incorporated herein by reference.

BACKGROUND

1. Field

Aspects of embodiments of the present invention relate to an optical laminate and an optical display apparatus including the same.

2. Description of the Related Art

As one of liquid crystal displays, there is an in-plane switching (IPS) mode liquid crystal display. The IPS mode liquid crystal display has problems of low contrast ratio at diagonal direction angles and a large difference in visibility between right and left sides due to inclination of liquid crystals.

Accordingly, the IPS mode liquid crystal display includes a positive C layer in a viewer-side polarizing plate to improve the contrast ratio at the diagonal direction angles and the difference in visibility between right and left sides. However, there is a limit to achievement of substantial reduction in difference in visibility between the right and left sides while substantially improving the contrast ratio. Despite reduction in difference in visibility between the right and left sides, improvement in contrast ratio is not always secured. In addition to the positive C layer, a retardation layer providing a certain degree of phase retardation may be stacked on a lower surface of a polarizer, for example, an upper or lower surface of the positive C layer. However, this structure has a problem of increase in thickness of the polarizing plate. The positive C layer may be formed of liquid crystals. However, this structure is undesirable due to high cost of the liquid crystals and low durability of the positive C layer.

The background technique of the present invention is disclosed in Japanese Unexamined Patent Publication No. 2006-251659 and the like.

SUMMARY

According to an aspect of embodiments of the present invention, an optical laminate that improves contrast ratio at diagonal direction angles while reducing difference in visibility between right and left sides when applied to an optical display panel is provided.

According to another aspect of embodiments of the present invention, an optical laminate that can suppress light leakage is provided.

Aspects of one or more embodiments of the present invention relate to an optical laminate.

According to one or more embodiments, an optical laminate includes: a polarizer; and a retardation layer stacked on a light incidence surface of the polarizer, wherein the retardation layer includes a positive C layer, the positive C layer having an in-plane retardation of 0 nm to 30 nm and an out-of-plane retardation of −50 nm to −15 nm at a wavelength of 550 nm, and the in-plane retardation of the positive C layer at a wavelength of 550 nm and an absolute value of a tilted angle of a slow axis of the positive C layer with respect to a light absorption axis of the polarizer satisfy the following Relation 1:

[Relation 1]

$$0° \leq Y \leq a \times X^b,$$

where X is the in-plane retardation of the positive C layer at a wavelength of 550 nm (unit: nm), Y is the absolute value of the tilted angle of the slow axis of the positive C layer with respect to the light absorption axis of the polarizer (unit: °), a is 13.666, and b is −1.056.

In one or more embodiments, the tilted angle of the slow axis of the positive C layer with respect to the light absorption axis of the polarizer may be in a range of −14° to +14°.

In one or more embodiments, Y in Relation 1 may be in a range of 0° to 14.5°.

In one or more embodiments, the retardation layer may be the positive C layer alone.

In one or more embodiments, the slow axis of the positive C layer may be tilted at an angle of −14° to −1° or +1° to +14° with respect to a machine direction (MD) of the positive C layer.

In one or more embodiments, the positive C layer may include a stretched non-liquid crystalline film.

In one or more embodiments, the positive C layer may include a stretched film including at least one resin selected from among a cellulose ester based resin, a polyester based resin, a cyclic polyolefin based resin, a polycarbonate based resin, a polyethersulfone based resin, a polysulfone based resin, a polyamide based resin, a polyimide based resin, a polyolefin based resin, a polyarylate based resin, a polyvinyl alcohol based resin, a polyvinyl chloride based resin, a polyvinylidene chloride based resin, and an acrylic based resin.

In one or more embodiments, the positive C layer may be bonded to the polarizer via a bonding layer.

In one or more embodiments, the optical laminate may further include a protective layer stacked on a light exit surface of the polarizer.

In one or more embodiments, a tilted angle of a slow axis of the protective layer with respect to the slow axis of the positive C layer may be in a range of −14° to +14°.

In one or more embodiments, the protective layer may have an in-plane retardation of 3,000 nm or more at a wavelength of 550 nm.

Aspects of one or more embodiments of the present invention relate to an optical display apparatus.

In one or more embodiments, an optical display apparatus includes an optical laminate according to an embodiment of the present invention.

According to an aspect of embodiments of the present invention, an optical laminate improves contrast ratio at diagonal direction angles while reducing difference in visibility between right and left sides when applied to an optical display panel.

According to another aspect of embodiments of the present invention, an optical laminate suppresses light leakage.

DETAILED DESCRIPTION

Figure 1:
FIG. 1 is a cross-sectional view of an optical laminate according to an embodiment of the present invention.

Herein, some embodiments of the present invention will be described in further detail with reference to the accompanying drawings to provide a thorough understanding of the invention to those skilled in the art. It is to be understood that the present invention may be embodied in different ways and is not limited to the following embodiments.

In the drawings, components unrelated to the description may be omitted for clear description of the invention, and like components will be denoted by like reference numerals throughout the specification. Although lengths, thicknesses, or widths of various components may be exaggerated for understanding in the drawings, the present invention is not limited thereto.

Herein, spatially relative terms, such as "upper" and "lower," are defined with reference to the accompanying drawings. Thus, for example, it is to be understood that "upper surface" may be used interchangeably with "lower surface." Also, when an element, such as a layer or a film, is referred to as being placed "on" another element, it may be directly placed on the other element, or one or more intervening elements may be present. On the other hand, when an element is referred to as being "placed directly on," "placed immediately on," "directly formed on," or "formed to directly contact" another element, there are no intervening element(s) therebetween.

Herein, "in-plane retardation Re," "out-of-plane retardation Rth," and "degree of biaxiality (NZ)" are represented by the following Equations A, B, and C, respectively:

$$Re = (nx - ny) \times d, \quad (A)$$

$$Rth = ((nx + ny)/2 - nz) \times d, \quad (B)$$

$$NZ = (nx - nz)/(nx - ny), \quad (C)$$

where nx, ny, and nz are indexes of refraction of a corresponding optical device in a slow axis direction, a fast axis direction, and a thickness direction of the optical device at a measurement wavelength, respectively, and d is the thickness thereof (unit: nm).

Herein, "+" indicates an angle in the clockwise direction, and "−" indicates an angle in the counterclockwise direction with respect to a reference (0°).

As used herein to represent a specific numerical range, "X to Y" means "greater than or equal to X and less than or equal to Y."

The inventors of the present invention provide an optical laminate that improves contrast ratio at diagonal direction angles while reducing difference in visibility between right and left sides when applied to an optical display panel, particularly an IPS mode liquid crystal panel. In the related art, there is a limit to achievement of substantial reduction in difference in visibility between right and left sides while substantially improving the contrast ratio.

The optical laminate according to one or more embodiments of the present invention includes: a polarizer; and a retardation layer stacked on a light incidence surface of the polarizer, wherein the retardation layer includes a positive C layer, the positive C layer having an in-plane retardation of 0 nm to 30 nm and an out-of-plane retardation of −50 nm to −15 nm at a wavelength of 550 nm, and the in-plane retardation of the positive C layer at a wavelength of 550 nm and an absolute value of a tilted angle of a slow axis of the positive C layer with respect to a light absorption axis of the polarizer satisfy Relation 1 herein. The optical laminate according to embodiments of the present invention can remarkably improve the contrast ratio at diagonal direction angles while remarkably reducing difference in visibility between right and left sides when applied to an IPS mode liquid crystal panel.

In one or more embodiments, the retardation layer may be a positive C layer alone, as described below. This means the positive C layer is only present between the polarizer and a display panel as a retardation layer.

Herein, an optical laminate according to an embodiment of the invention will be described with reference to FIG. 1.

Referring to FIG. 1, an optical laminate according to an embodiment may include a polarizer 10, a positive C layer 20, a protective layer 30, and bonding layers 40 and 50.

The positive C layer 20 is stacked on a lower surface of the polarizer 10, that is, a light incidence surface of the polarizer 10, through which internal light enters the polarizer 10. The protective layer 30 is stacked on an upper surface of the polarizer 10, that is, on a light exit surface of the polarizer 10, through which the internal light exits the polarizer 10. Here, "internal light" means light emitted from an optical display panel, for example, an IPS mode or FFS mode liquid crystal panel, and entering the polarizer 10. The internal light may be light emitted from a backlight unit and exiting the liquid crystal panel after passing through the liquid crystal panel.

Positive C Layer

The positive C layer 20 emits light toward the polarizer 10 through change in transmission direction of internal light emitted from the optical display panel (disposed on a lower surface of the positive C layer 20 in FIG. 1, not shown). According to embodiments of the present invention, the positive C layer 20 improves the contrast ratio and visibility at right and left sides even without another retardation layer on the light incidence surface of the polarizer 10.

In an embodiment, the positive C layer 20 may have an in-plane retardation of 0 nm to 30 nm and an out-of-plane retardation of −50 nm to −15 nm at a wavelength of 550 nm. Within this range, the positive C layer 20 can facilitate maximizing or increasing the contrast ratio at diagonal direction angles while improving visibility at right and left sides. The in-plane retardation and the out-of-plane retardation are selected to improve the contrast ratio and visibility at the right and left sides in combination with Relation 1 described below, even without another retardation layer between the positive C layer 20 and the polarizer 10 and/or on the lower surface of the positive C layer 20, that is, between the positive C layer 20 and the liquid crystal panel.

In an embodiment, the positive C layer 20 may have an in-plane retardation of 0 nm, 0.5 nm, 1 nm, 1.5 nm, 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 8.5 nm, 9 nm, 9.5 nm, 10 nm, 10.5 nm, 11 nm, 11.5 nm, 12 nm, 12.5 nm, 13 nm, 13.5 nm, 14 nm, 14.5 nm, 15 nm, 15.5 nm, 16 nm, 16.5 nm, 17 nm, 17.5 nm, 18 nm, 18.5 nm, 19 nm, 19.5 nm, 20 nm, 20.5 nm, 21 nm, 21.5 nm, 22 nm, 22.5 nm, 23 nm, 23.5 nm, 24 nm, 24.5 nm, 25 nm, 25.5 nm, 26 nm, 26.5 nm, 27 nm, 27.5 nm, 28 nm, 28.5 nm, 29 nm, 29.5 nm, or 30 nm, at a wavelength of 550 nm. In an embodiment, the positive C layer 20 may have an out-of-plane retardation of −50 nm, −49 nm, −48 nm, −47 nm, −46 nm, −45 nm, −44 nm, −43 nm, −42 nm, −41 nm, −40 nm, −39 nm, −38 nm, −37 nm, −36 nm, −35 nm, −34 nm, −33 nm, −32 nm, −31 nm, −30 nm, −29 nm, −28 nm, −27 nm, −26 nm, −25 nm, −24 nm, −23 nm, −22 nm, −21 nm, −20 nm, −19 nm, −18 nm, −17 nm, −16 nm, or −15 nm, at a wavelength of 550 nm.

In an embodiment, the positive C layer 20 has an in-plane retardation of 0.5 nm to 9 nm, and, in an embodiment, 1 nm to 8 nm, at a wavelength of 550 nm. In an embodiment, the positive C layer 20 has an out-of-plane retardation of −25 nm to −10 nm, and, in an embodiment, −25 nm to −15 nm, at a wavelength of 550 nm.

The positive C layer 20 is a stretched film and has a slow axis and a fast axis in the in-plane direction thereof. Here, the slow axis corresponds to a direction providing a relatively high index of refraction in the in-plane direction, and the fast axis corresponds to a direction providing a relatively low index of refraction in the in-plane direction. According to embodiments of the present invention, in using the positive C layer 20 having the slow axis, a stretched film is used as the positive C layer 20. Since a typical positive C layer composed of a crystal layer or a positive C layer composed of a non-crystalline layer and formed by coating does not require a stretching process, these positive C layers do not have the slow axis.

In an embodiment, the slow axis of the positive C layer 20 is tilted at an angle of −14° to −1° or +1° to +14°, and, in an embodiment, −14°, −13°, −12°, −11°, −10°, −9°, −8°, −7°, −6°, −5°, −4°, −3°, −2°, −1°, +1°+2°, +3°, +4°, +5°, +6°, +7°, +8°, +9°, +10°, +11°, +12°, +13°, or +14°, and, in an embodiment, at an angle of −10° to −2°, or +2° to +10°, with respect to the machine direction (MD) thereof. Within this range, the optical laminate can easily satisfy Relation 1.

In the optical laminate, the in-plane retardation of the positive C layer 20 at a wavelength of 550 nm and an absolute value of an angle between a light absorption axis of the polarizer 10 and the slow axis of the positive C layer 20 satisfy the following Relation 1:

$$0° \leq Y \leq a \times X^b, \quad (1)$$

where X is in-plane retardation of the positive C layer 20 at a wavelength of 550 nm (unit: nm), Y is an absolute value of the tilted angle of the slow axis of the positive C layer 20 with respect to the light absorption axis of the polarizer (unit: °), a is 13.666, and b is −1.056.

In Relation 1, the tilted angle of the slow axis of the positive C layer 20 with respect to the light absorption axis of the polarizer 10 may be a positive (+) value or a negative (−) value.

Figure 2:
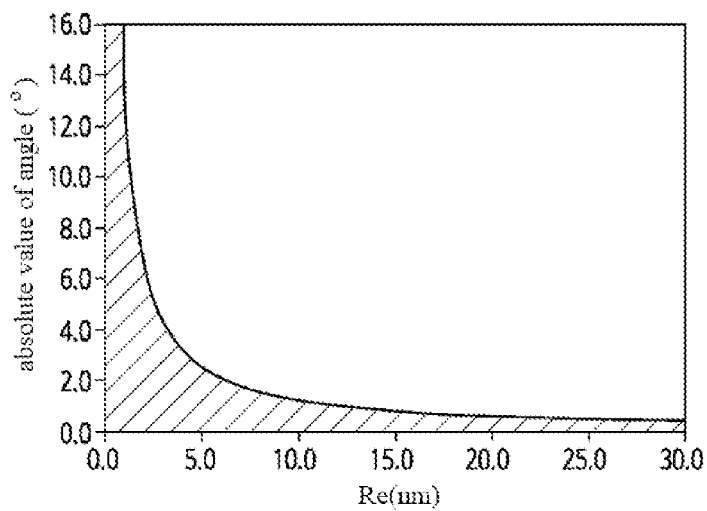
FIG. 2 is a graph illustrating Relation 1 set forth herein.

Relation 1 will be described in further detail with reference to FIG. 2. FIG. 2 is a graph illustrating Relation 1.

Referring to FIG. 2, the X axis denotes the in-plane retardation of the positive C layer (unit: nm), and the Y axis denotes an absolute value of the tilted angle of the slow axis of the positive C layer with respect to the light absorption axis of the polarizer (unit: °). FIG. 2 shows a curved graph in which $Y = a \times X^b$, a is 13.666, and b is −1.056. The graph shown in FIG. 2 corresponds to results of Tables 1 and 2.

Within the above ranges of the in-plane retardation and the out-of-plane retardation of the positive C layer, in combination of the tilted angle of the slow axis of the positive C layer with respect to the light absorption axis of the polarizer with the in-plane retardation of the positive C layer in which the positive C layer has a certain in-plane retardation in the range of 0 nm to 30 nm, the positive C layer may be stacked on the polarizer such that the tilted angle of the slow axis of the positive C layer with respect to the light absorption axis of the polarizer is included in a curved plot of the graph shown in FIG. 2, and a lower region under the curved plot (a cross-hatched portion in FIG. 2), thereby achieving remarkable improvement in contrast ratio at diagonal direction angles while significantly reducing difference in color visibility at left and right sides when applied to an IPS-mode liquid crystal panel. The inventors confirmed that, when the absolute value of the angle of the slow axis of the positive C layer with respect to the light absorption axis of the polarizer is greater than the Y value, improvement in at least one of the contrast ratio at diagonal direction angles and difference in color visibility at diagonal direction angles can be easily achieved.

In an embodiment, despite change in in-plane retardation of the positive C layer, the Y value may be in the range of 0° to 14.5°, and, in an embodiment, 0°, 0.5°, 1°, 1.5°, 2°, 2.5°, 3°, 3.5°, 4°, 4.5°, 5°, 5.5°, 6°, 6.5°, 7°, 7.5°, 8°, 8.5°, 9°, 9.5°, 10°, 10.5°, 11°, 11.5°, 12°, 12.5°, 13°, 13.5°, 14°, or 14.5°, and, in an embodiment, greater than 0° to 14.5°, or 1° to 14.5°. Within this range, the optical laminate can efficiently realize the effects of the present invention.

In an embodiment, the angle of the slow axis of the positive C layer 20 with respect to the light absorption axis of the polarizer 10 may be in a range of −14.5° to +14.5°, and, in an embodiment, −14.5° to less than 0°, −14.5° to −1°, greater than 0° to +14.5°, or +1° to +14.5°. Within this range, the optical laminate can efficiently realize the effects of the present invention.

Next, a method of satisfying Relation 1 will be described.

When the in-plane retardation of the positive C layer 20 in the optical laminate is determined, the Y value, that is, the range of the absolute value of the tilted angle of the slow axis of the positive C layer 20 with respect to the light absorption axis of the polarizer 10 is calculated according to Relation 1: $Y = a \times X^b$ (a=13.666, b=−1.056), and the positive C layer 20 is stacked on the polarizer 10 to satisfy the calculated range of the absolute value.

The positive C layer 20 may be formed of a non-liquid crystalline material capable of realizing the in-plane retardation and the out-of-plane retardation within the above ranges by stretching the non-liquid crystalline material in a certain direction so as to satisfy nz>nx=ny (nx, ny, and nz being the indexes of refraction in the slow axis, the fast axis, and the thickness direction at a wavelength of 550 nm, respectively).

In an embodiment, the positive C layer 20 may be a stretched film formed of at least one resin selected from among a cellulose-based resin, such as triacetylcellulose (TAC) and the like, a polyester-based resin, such as poly-

TABLE 1

| Re | 0.5 | 1.0 | 1.6 | 2.0 | 2.2 | 2.4 | 2.6 | 2.8 | 3.0 | 4.0 | 5.0 | 6.0 | 7.0 |
|---|---|---|---|---|---|---|---|---|---|---|---|---|---|
| Y value | 14.5 | 13.7 | 8.3 | 6.6 | 5.9 | 5.4 | 5.0 | 4.6 | 4.3 | 3.2 | 2.5 | 2.1 | 1.8 |

TABLE 2

| Re | 8.0 | 9.0 | 10.0 | 11.0 | 12.0 | 13.0 | 14.0 | 15.0 | 17.0 | 20.0 | 23.0 | 25.0 | 27.0 | 30.0 |
|---|---|---|---|---|---|---|---|---|---|---|---|---|---|---|
| Y value | 1.5 | 1.3 | 1.2 | 1.1 | 1.0 | 0.9 | 0.8 | 0.8 | 0.7 | 0.6 | 0.5 | 0.5 | 0.4 | 0.4 | ethylene terephthalate, polybutylene terephthalate, polyethylene naphthalate, polybutylene naphthalate, and the like, a cyclic polyolefin (COP)-based resin, a polycarbonate-based resin, a polyethersulfone-based resin, a polysulfone-based resin, a polyamide-based resin, a polyimide-based resin, a polyolefin-based resin, a polyarylate-based resin, a polyvinyl alcohol-based resin, a polyvinyl chloride-based resin, a polyvinylidene chloride-based resin, and an acrylic-based resin, without being limited thereto.

In another embodiment, the positive C layer 20 may be formed by preparing a non-stretched film from a composition including a cellulosic compound or a polymer thereof and/or an aromatic compound or a polymer thereof, followed by stretching the non-stretched film. The compound may include a monomer, an oligomer, a polymer, or a resin.

The cellulose compound may include at least a unit, in which at least some hydroxyl groups [a $C_2$ hydroxyl group, a $C_3$ hydroxyl group or a $C_6$ hydroxyl group] of a sugar monomer constituting cellulose are substituted with an acyl group or an ester group. That is, the cellulose compound may include a cellulose ester compound and/or a cellulose ether compound.

For example, the cellulose compound may include at least a unit, in which at least some hydroxyl groups [a $C_2$ hydroxyl group, a $C_3$ hydroxyl group or a $C_6$ hydroxyl group] of a sugar monomer constituting cellulose are substituted with an acyl group, as represented by the following Formula 1, where the acyl group may be substituted or unsubstituted with a substituent group:

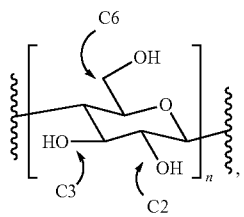

where n is an integer of 1 or more.

A substituent group for the cellulose ester or acyl group may include at least one selected from among a halogen atom, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a hetero aryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(=O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen-based compounds for convenience. The composition may include the cellulose ester compound alone or a mixture including the cellulose ester compound.

Here, "halogen" means fluorine (F), Cl, Br, or I, and, in an embodiment, F.

The "halogen-containing functional group" is an organic functional group containing at least one halogen atom and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—* (* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

For formation of the positive C layer 20, the cellulose ester compound may be prepared by a typical method known to those skilled in the art or may be obtained from commercially available products. For example, the cellulose ester compound having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

The aromatic compound includes a phenyl group and may include a polystyrene compound or a fluorobenzene or difluorobenzene structure, without being limited thereto. In an embodiment, the polystyrene compound may include a moiety represented by the following Formula 2:

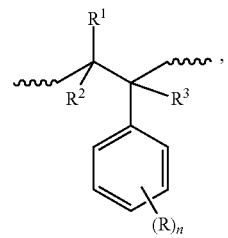

where ⁓⁓⁓ is a linking site of an atom, $R^1$, $R^2$, and $R^3$ are each independently a hydrogen atom, an alkyl group, a substituted alkyl group, or a halogen; each R is independently a substituent group on a styrene ring; and n is an integer of 0 to 5 indicating the number of substituent groups on the styrene ring.

Examples of the substituent group R on the styrene ring may include an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group.

In an embodiment, at least one of $R^1$, $R^2$ and $R^3$ may be hydrogen or a halogen, and, in an embodiment, hydrogen or fluorine.

A composition for the positive C layer 20 may further include an aromatic fused ring-containing additive in addition to the cellulose compound and the aromatic compound. The aromatic fused ring-containing additive adjusts wavelength dispersion. The aromatic fused ring-containing additive may include 2-naphthyl benzoate, anthracene, phenanthrene, 2,6-naphthalene dicarboxylic acid diester, and the like. In an embodiment, the aromatic fused ring-containing additive may be present in an amount of 0.1 wt % to 30 wt %, and, in an embodiment, 1 wt % to 10 wt %, in the composition for the positive C layer 20. Within this range, the aromatic fused ring-containing compound can adjust retardation and wavelength dispersion.

A non-stretched film is prepared from the composition for the positive C layer 20. The non-stretched film may be prepared from the composition for the positive C layer 20 through solution casting, melt extrusion, and the like. In an embodiment, the non-stretched film is prepared from the composition for the positive C layer 20 through solution casting to improve processability and economic feasibility.

The positive C layer 20 may be formed by uniaxially stretching the non-stretched film in the MD or TD. Stretching may be realized by dry stretching and/or wet stretching and may be performed at a temperature of 70° C. to 250° C., and, in an embodiment, 80° C. to 200° C., and, in an embodiment, 100° C. to 200° C. Within this range, the same stretching effect can be achieved.

An elongation ratio may be adjusted depending upon the in-plane retardation and the out-of-plane retardation of the positive C layer 20. For example, the non-stretched film may be stretched to 1.2 times to 5 times, and, in an embodiment, 1.2 times to 3 times, an initial length thereof in each of the MD and the TD.

In an embodiment, the positive C layer 20 may satisfy an equation: $(nx+ny+nz)/3=1.4$ to 1.6, and, in an embodiment, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, or 1.6, and, in an embodiment, 1.48 to 1.51, and, in an embodiment, 1.49 to 1.50 (nx, ny, and nz being the indexes of refraction in the slow axis, the fast axis, and the thickness direction at a wavelength of 550 nm, respectively). Within this range, the positive C layer 20 can improve color deviation when stacked on the polarizer 10 via a bonding layer.

In an embodiment, the positive C layer 20 is formed of a material exhibiting negative birefringence. Here, "negative birefringence" refers to characteristics of a transparent film that exhibits birefringence characteristics upon stretching and has an index of refraction increasing in an orthogonal direction to a stretching direction. For example, the positive C layer 20 may be a film formed of at least one resin selected from among a cellulose ester resin including triacetylcellulose (TAC) and the like, a cyclic olefin polymer (COP) resin, and an acrylic resin.

In an embodiment, the positive C layer 20 may have a thickness of 1 μm to 60 μm, and, in an embodiment, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, 50 μm, 51 μm, 52 μm, 53 μm, 54 μm, 55 μm, 56 μm, 57 μm, 58 μm, 59 μm, or 60 μm, and, in an embodiment, 20 μm to 50 μm. Within this range, the positive C layer 20 can be applied to the optical laminate and can easily realize phase retardation according to the present invention.

Polarizer

The polarizer 10 includes a light absorption type polarizer that divides incident light into two polarized fractions orthogonal to each other to allow one of the two polarized fractions to pass therethrough while absorbing the other fraction.

In an embodiment, in the in-plane direction of the polarizer 10, an axis of the polarizer 10 exhibiting a higher index of refraction may be a light absorption axis, and an axis of the polarizer 10 exhibiting a lower index of refraction may be a light transmission axis.

In an embodiment, the light absorption axis of the polarizer 10 may correspond to the machine direction (MD) thereof, and the light transmission axis of the polarizer 10 may correspond to the transverse direction (TD) thereof.

In an embodiment, the polarizer 10 may have a degree of polarization of 95% or more, and, in an embodiment, 95% to 100%, and, in an embodiment, 98% to 100%. Within this range, the polarizer 10 can further improve front contrast while improving durability.

In an embodiment, the polarizer 10 may have a light transmittance of 40% or more, and, in an embodiment, 40% to 45%. Within this range, the polarizer 10 can be used in the optical laminate.

In an embodiment, the polarizer 10 may include a dichroic dye-containing polarizer subjected to uniaxial stretching.

In an embodiment, the dichroic dye-containing polarizer may include a polarizer prepared by uniaxially stretching a base film in the MD, followed by dyeing with dichroic dyes (for example, iodine or potassium iodide as an iodine-containing substance). The base film may include a polyvinyl alcohol film or derivatives thereof, without being limited thereto. The polarizer may be manufactured by a typical method known to those skilled in the art.

In an embodiment, the polarizer 10 may have a thickness of 1 μm to 40 μm, and, in an embodiment, 5 μm to 30 μm, and, in an embodiment, 10 μm to 25 μm. Within this range, the polarizer 10 can be used in the optical laminate.

Protective Layer

The protective layer 30 may be disposed on a light exit surface of the polarizer 10 to protect the polarizer 10 or to further improve image quality through control of light emitted from the polarizer 10.

The protective layer 30 may include a protective film or a protective coating layer.

The protective film is an optically transparent film and may be formed of at least one resin selected from among, for example, a cellulose resin, such as triacetylcellulose (TAC) and the like, a polyester resin, such as polyethylene terephthalate, polybutylene terephthalate (PET), polyethylene naphthalate, and polybutylene naphthalate, a cyclic polyolefin resin, a polycarbonate resin, a polyethersulfone resin, a polysulfone resin, a polyamide resin, a polyimide resin, a polyolefin resin, a polyarylate resin, a polyvinyl alcohol resin, a polyvinyl chloride resin, and a polyvinylidene chloride resin. In an embodiment, a TAC film or a PET film may be used. The protective coating layer may be formed of a heat curable composition and/or a photocurable composition.

In an embodiment, the protective layer 30 may be a retardation film.

In an embodiment, the protective layer 30 may have an in-plane retardation (Re) of 3,000 nm or more, and, in an embodiment, 3,000 nm, 4,000 nm, 5,000 nm, 6,000 nm, 7,000 nm, 8,000 nm, 9,000 nm, 10,000 nm, 11,000 nm, 12,000 nm, 13,000 nm, 14,000 nm, or 15,000 nm, and, in an embodiment, 5,000 nm to 15,000 nm, and, in an embodiment, 5,000 nm to 12,000 nm, at a wavelength of 550 nm.

Within this range, the protective film can achieve improvement in front contrast while suppressing generation of rainbow mura.

In an embodiment, the protective layer 30 may have an out-of-plane retardation (Rth) of 6,000 nm or more, and, in an embodiment, 6,000 nm, 7,000 nm, 8,000 nm, 9,000 nm, 10,000 nm, 11,000 nm, 12,000 nm, 13,000 nm, 14,000 nm, or 15,000 nm, and, in an embodiment, 6,000 nm to 15,000 nm, and, in an embodiment, 6,000 nm to 12,000 nm, at a wavelength of 550 nm. Within this range, the protective layer 30 can suppress generation of spots due to birefringence while improving viewing angle characteristics in a liquid crystal display apparatus.

In an embodiment, the protective layer 30 may have a degree of biaxiality (NZ) of 2.5 or less, and, in an embodiment, 1.0, 1.1, 1.2, 1.3, 1.4, 1.5, 1.6, 1.7, 1.8, 1.9, 2.0, 2.1, 2.2, 2.3, 2.4, or 2.5, and, in an embodiment, 1.0 to 2.2, and, in an embodiment, 1.2 to 2.0, and, in an embodiment, 1.4 to 1.8, at a wavelength of 550 nm. Within this range, the protective layer can suppress generation of spots due to birefringence while maintaining mechanical strength thereof.

In an embodiment, the protective layer 30 may be a film formed of the aforementioned material and stretched at a certain elongation (e.g., a predetermined elongation). As a result, the protective layer 30 may have a slow axis and a fast axis in the in-plane direction thereof.

In an embodiment, in the in-plane direction of the protective layer 30, an axis of the protective layer 30 exhibiting a low index of refraction may be the machine direction (MD) thereof, and an axis of the protective layer 30 exhibiting a high index of refraction may be the transverse direction (TD) thereof. In this case, the protective layer 30 may be a TD-uniaxially stretched protective film.

In another embodiment, in the in-plane direction of the protective layer 30, the axis of the protective layer 30 exhibiting a low index of refraction may be the TD thereof, and the axis of the protective layer exhibiting a high index of refraction may be the MD thereof. In this case, the protective layer 30 may be an MD-uniaxially stretched protective film.

In a further embodiment, in the in-plane direction of the protective layer 30, the axis of the protective layer 30 exhibiting a low index of refraction may be an oblique direction with respect to the TD thereof, and the axis of the protective layer 30 exhibiting a high index of refraction may be an oblique direction with respect to the MD thereof. In this case, the protective layer 30 may be an MD/TD-biaxially stretched protective film or coating layer.

In an embodiment, in the in-plane direction of the protective layer 30, the axis of the protective layer 30 exhibiting a high index of refraction may be the MD thereof, and the axis of the protective layer 30 exhibiting a low index of refraction may be the TD thereof, thereby improving processability and economic feasibility through a roll-to-roll process in consideration of an axial relationship between the retardation layer and the polarizer in manufacture of the optical laminate. The following description will focus on the above structure.

In an embodiment, the protective layer 30 may include a TD-uniaxially stretched protective film to have the axis exhibiting a low index of refraction and the axis exhibiting a high index of refraction in the in-plane direction.

In an embodiment, the TD-uniaxially stretched protective film may be manufactured by stretching a non-stretched film formed through melt extrusion of a resin for the protective film to a length of 100% to 200%, and, in an embodiment, 120% to 140%, of the width of an initial resin film only in the TD.

Stretching may be realized by dry stretching and/or wet stretching and may be performed at a temperature of (Tg−20) °C. to (Tg+50) °C., where Tg is the glass transition temperature of the resin for the protective film, and, in an embodiment, 70° C. to 250° C., and, in an embodiment, 80° C. to 200° C., and, in an embodiment, 100° C. to 200° C. Within this range, it is possible to achieve the same stretching effect.

In an embodiment, the slow axis of the protective layer is tilted at an angle of −14° to +14°, and, in an embodiment, −14°, −13°, −12°, −11°, −10°, −9°, −8°, −7°, −6°, −5°, −4°, −3°, −2°, −1°, 0°, +1°, +2°, +3°, +4°, +5°, +6°, +7°, +8°, +9°, +10°, +11°, +12°, +13°, or +14°, and, in an embodiment, −9° to +9°, and, in an embodiment, 0°, with respect to the slow axis of the positive C layer 20. Within this range, the protective film can provide the effects of improving the contrast ratio while reducing difference in visibility at right and left sides.

In an embodiment, the protective layer 30 may have a thickness of 100 μm or less, and, in an embodiment, greater than 0 μm to 70 μm, and, in an embodiment, 5 μm to 70 μm, and, in an embodiment, 15 μm to 80 μm. Within this range, the protective layer 30 can be used in the optical laminate.

Although not shown in FIG. 1, the protective layer 30 may be formed on an upper surface thereof with a functional coating layer to provide an additional function to the optical laminate. For example, the functional coating layer may include at least one selected from the group consisting of a hard coating layer, an anti-fingerprint layer, an antireflective layer, an antiglare layer, a low reflective layer, and combinations thereof.

Bonding Layer

The polarizer 10 may be bonded to the positive C layer 20 via a bonding layer 50. The polarizer 10 may be bonded to the protective layer 30 via a bonding layer 40.

Each of the bonding layers 40, 50 may be formed of a typical bonding agent, such as a water-based bonding agent, a photocurable bonding agent, and the like, which is well-known to those skilled in the art. In an embodiment, each of the bonding layers 40, 50 is formed of a photocurable bonding agent. The bonding layers 40, 50 may have the same thickness or different thicknesses and, in an embodiment, each of the bonding layers 40, 50 may have a thickness of 1 μm to 10 μm, and, in an embodiment, 2 μm to 5 μm, without being limited thereto.

In an embodiment, the polarizing plate may have a degree of polarization of 99.999% or more, for example, 99.999% to 100%. For measurement of the degree of polarization, the optical laminate is mounted in a device for measuring the degree of polarization, for example, an UV-VIS spectrophotometer, in which a reference polarizer having a degree of polarization of 99.999% is mounted. Then, with the polarizer of the optical laminate disposed such that the light absorption axis of the polarizer is orthogonal or parallel to the light absorption axis of the reference polarizer, light is transmitted through the optical laminate to travel from the positive C layer toward the polarizer to measure the degree of polarization.

An optical display apparatus according to one or more embodiments of the present invention includes the optical laminate according to an embodiment of the present invention. In an embodiment, the optical display apparatus includes an IPS or FFS mode liquid crystal display apparatus.

The liquid crystal display apparatus includes a liquid crystal panel, the optical laminate according to an embodiment of the present invention on a light exit surface of the liquid crystal panel, and a polarizing plate (light source-side polarizing plate) on a light incidence surface of the liquid crystal panel. The polarizing plate disposed on the light incidence surface of the liquid crystal panel may include a typical polarizing plate known to those skilled in the art. In an embodiment, the optical laminate according to the present invention may be used as a viewer-side polarizing plate, but is not limited thereto. In another embodiment, the optical laminate may be used as the viewer-side polarizing plate or the light source-side polarizing plate.

The liquid crystal panel allows change in alignment of liquid crystals depending upon whether voltage is applied thereto, whereby light emitted from a light source can pass therethrough.

The liquid crystal panel may include a pair of substrates and a liquid crystal layer interposed between the substrates and acting as a display medium. A substrate (color filter substrate) is provided with a color filter and a black matrix, and another substrate (active matrix substrate) is provided with a switching element (for example, TFT) for controlling electrical and optical properties of liquid crystals, and signal lines and pixel lines for supplying gate signals to the switching element, without being limited thereto.

In an embodiment, the liquid crystal panel may adopt in-plane switching (IPS) mode or fringe field switching (FFS) mode liquid crystals. As a result, the liquid crystal display can improve viewing angle characteristics.

In an embodiment, the liquid crystal panel may have an in-plane retardation of 60 nm to 150 nm, and, in an embodiment, 70 nm to 120 nm, at a wavelength of 550 nm. Within this range, the liquid crystal panel can facilitate improvement in viewing angle characteristics. The in-plane retardation of the liquid crystal panel at a wavelength of 550 nm may be controlled through adjustment in thickness of a liquid crystal layer of the liquid crystal panel.

The liquid crystal display apparatus includes a light source on a lower surface of the light source-side polarizing plate. The light source may include a light source having a continuous luminous spectrum. For example, the light source may include any of a white LED light source, a quantum-dot (QD) light source, a metal fluoride red phosphor light source, and, in an embodiment, a KSF ($K_2SiF_6$:$Mn^{4+}$) phosphor or KTF ($K_2TiF_6$:$Mn^{4+}$) phosphor-containing light source, and the like.

Next, the present invention will be described in further detail with reference to some examples. However, these examples are provided for illustration and should not be construed in any way as limiting the invention.

Example 1

A polyvinyl alcohol film (VF-TS #4500, thickness: 45 μm, Kuraray Co., Ltd.) was uniaxially stretched to two times an initial length thereof at 30° C. in the MD, dyed with iodine, and stretched in an aqueous solution of boric acid at 60° C. to prepare a polarizer (thickness: 18 μm).

A non-stretched film was produced from a composition for a positive C layer (containing a cellulose ester compound, VM Series, Eastman Co., Ltd.) by solution casting, followed by biaxial stretching at 140° C. to prepare a positive C film (thickness: 30 μm).

A polyethylene terephthalate (PET) film having an antiglare coating layer (thickness: 85 μm, Re: 8,500 nm @ 550 nm, Rth: 9,300 nm @ 550 nm, TD-uniaxially stretched film, Toyobo Co., Ltd.) was bonded to an upper surface of the polarizer. A lower surface of the polarizer was bonded to the positive C film to prepare an optical laminate. Bonding was performed using a UV curable bonding agent, and each bonding layer had a thickness of 2 μm to 3 μm.

In the optical laminate, the slow axis of the PET film was tilted at an angle of 0° with respect to the slow axis of the positive C film.

Examples 2 to 10

Each optical laminate was fabricated in the same manner as in Example 1 except that a positive C film having retardation as listed in Table 3 was formed by changing the elongation ratio and/or the stretching temperature of the positive C film and the tilted angle of the positive C film with respect to the light absorption axis of the polarizer as listed in Table 3.

Comparative Example 1

An optical laminate was fabricated in the same manner as in Example 1 except that the tilted angle of the positive C film with respect to the light absorption axis of the polarizer was changed as listed in Table 3.

Comparative Example 2

An optical laminate was fabricated in the same manner as in Example 3 except that the tilted angle of the positive C film with respect to the light absorption axis of the polarizer was changed as listed in Table 3.

Comparative Example 3

An optical laminate was fabricated in the same manner as in Example 5 except that the tilted angle of the positive C film with respect to the light absorption axis of the polarizer was changed as listed in Table 3.

Comparative Examples 4 to 6

Each optical laminate was fabricated in the same manner as in Example 1 except that a positive C film having retardation as listed in Table 3 was formed by changing the elongation ratio and/or the stretching temperature of the positive C film and the tilted angle of the positive C film with respect to the light absorption axis of the polarizer as listed in Table 3.

Fabrication of Light Source-Side Polarizing Plate

A polarizer was fabricated in the same manner as above. A light source-side polarizing plate was fabricated by bonding a triacetylcellulose (TAC) film (KC4CT1SW, thickness: 40 μm, Konica Minolta Opto Inc.) to an upper surface of the polarizer and bonding a polyethylene terephthalate (PET) film (thickness: 80 μm, Re: 8,400 nm @ 550 nm, Rth: 9,800 nm @ 550 nm, Toyobo Co., Ltd.) to a lower surface of the polarizer.

Fabrication of Liquid Crystal Module

Each of the optical laminates fabricated in the Examples and Comparative Examples was bonded to a light exit surface of an IPS liquid crystal-containing liquid crystal panel via a bonding layer. Here, a positive C layer of the optical laminate was bonded to the liquid crystal panel. A liquid crystal module was fabricated by bonding the light source-side polarizing plate to a light incidence surface of the IPS liquid crystal-containing liquid crystal panel via a bonding layer. Here, a TAC film of the light source-side polarizing plate was bonded to the liquid crystal panel.

The optical laminates fabricated in the Examples and Comparative Examples were evaluated as to the following properties listed in Table 3.

(1) Visibility at right and left sides: A liquid crystal module was fabricated from each of the optical laminates of the Examples and Comparative Examples using the method described above. Color coordinates (x, y) were obtained at each of (45°, 60°) and (135°, 60°) by setting left (45°)/right (135°) angles at a black color azimuth of 60° using an EZ-Contrast XL-88. A distance between (45°, 60°) and (135°, 60°) was calculated as Δ(x, y). Δ(x, y) of 0.21 or less was rated as ⊚; Δ(x, y) of greater than 0.21 to 0.23 was rated as ○; Δ(x, y) of greater than 0.23 to 0.25 was rated as Δ; and Δ(x, y) of greater than 0.25 was rated as x.

(2) Contrast ratio: A contrast ratio of the liquid crystal module at diagonal direction angles was measured using an SR3 spectroradiometer (TOPCON). The contrast ratio was obtained by calculating the ratio of brightness in a white mode to brightness in a black mode. A higher contrast ratio of 1,140 or more indicates better screen quality.

TABLE 1

| | Positive C | | | Y in Eq. 1 | Satisfaction of Eq. 1 | Color coordinates at (45°, 60°) | | Color coordinates at (135°, 60°) | | | Visibility at right and left side | Contrast ratio |
|---|---|---|---|---|---|---|---|---|---|---|---|---|
| | Re | Rth | Angle | | | x | y | x | Y | Δ(x, y) | | |
| Example 1 | 5.4 | −25 | −1.2 | 2.3 | ○ | 0.2622 | 0.2581 | 0.2736 | 0.2714 | 0.017 | ⊚ | 1166 |
| Example 2 | 5.4 | −25 | 0.5 | 2.3 | ○ | 0.2622 | 0.2581 | 0.2736 | 0.2714 | 0.017 | ⊚ | 1170 |
| Comparative Example 1 | 5.4 | −25 | −6.5 | 2.3 | x | 0.2622 | 0.2581 | 0.2736 | 0.2714 | 0.017 | ⊚ | 1114 |
| Example 3 | 6.4 | −22 | −0.3 | 1.9 | ○ | 0.2584 | 0.2549 | 0.2685 | 0.2659 | 0.015 | ⊚ | 1179 |
| Example 4 | 6.4 | −22 | −1.5 | 1.9 | ○ | 0.2584 | 0.2549 | 0.2685 | 0.2659 | 0.015 | ⊚ | 1184 |
| Comparative Example 2 | 6.4 | −22 | 8.0 | 1.9 | x | 0.2584 | 0.2549 | 0.2685 | 0.2659 | 0.015 | ⊚ | 1116 |
| Example 5 | 2 | −17 | 5.5 | 6.6 | ○ | 0.2669 | 0.2616 | 0.2800 | 0.2779 | 0.021 | ⊚ | 1140 |
| Example 6 | 2 | −17 | −3.5 | 6.6 | ○ | 0.2669 | 0.2616 | 0.2800 | 0.2779 | 0.021 | ⊚ | 1141 |
| Comparative Example 3 | 2 | −17 | 14 | 6.6 | x | 0.2669 | 0.2616 | 0.2800 | 0.2779 | 0.021 | ⊚ | 1118 |
| Example 7 | 4 | −15 | 2.0 | 3.0 | ○ | 0.2662 | 0.2614 | 0.2788 | 0.2769 | 0.020 | ⊚ | 1161 |
| Example 8 | 0.5 | −25 | 14 | 14.5 | ○ | 0.2642 | 0.2607 | 0.2761 | 0.2748 | 0.018 | ⊚ | 1170 |
| Example 9 | 5 | −19 | −2.5 | 2.5 | ○ | 0.2621 | 0.2580 | 0.2734 | 0.27119 | 0.017 | ⊚ | 1140 |
| Example 10 | 9 | −18 | 1.3 | 1.3 | ○ | 0.261 | 0.2580 | 0.2720 | 0.2700 | 0.016 | ⊚ | 1141 |
| Comparative Example 4 | 5.6 | −22.6 | −12 | 2.2 | x | 0.2621 | 0.2580 | 0.2734 | 0.2712 | 0.017 | ⊚ | 1009 |
| Comparative Example 5 | 0 | 0 | 0 | 45 | x | 0.2763 | 0.2601 | 0.2988 | 0.2918 | 0.039 | x | 1169 |
| Comparative Example 6 | 25 | −22 | 2.0 | 0.4 | x | 0.2605 | 0.2595 | 0.2691 | 0.2685 | 0.012 | ⊚ | 1110 |

*Angle in Table 3: Angle of the slow axis of the positive C layer with respect to the light absorption axis of the polarizer in optical laminate (unit: °)

* Y in Eq. 1: Absolute value of $a \times X^b$ (X is in-plane retardation of positive C layer at a wavelength of 550 nm (unit: nm), a is 13.666, and b is −1.056)

As shown in Table 3, the optical laminate according to embodiments of the present invention achieved improvement in contrast ratio at diagonal direction angles while reducing difference in visibility between right and left sides when applied to an optical display panel. In addition, although not shown in Table 3, the optical laminate according to embodiments of the present invention could suppress light leakage. By contrast, the optical laminates of the Comparative Examples failed to provide the effects of the present invention.

Although some embodiments have been described herein, it is to be understood that various modifications, changes, alterations, and equivalent embodiments can be made by those skilled in the art without departing from the spirit and scope of the present invention.

What is claimed is:
1. An optical laminate comprising:
a polarizer; and
a retardation layer stacked on a light incidence surface of the polarizer,
wherein the retardation layer comprises a positive C layer, the positive C layer having an in-plane retardation of 0 nm to 30 nm and an out-of-plane retardation of −25 nm to −15 nm at a wavelength of 550 nm, and
the in-plane retardation of the positive C layer at a wavelength of 550 nm and an absolute value of a tilted angle of a slow axis of the positive C layer with respect to a light absorption axis of the polarizer satisfy the following Relation 1:

$$0° \leq Y \leq a \times X^b,$$

where X is the in-plane retardation of the positive C layer at a wavelength of 550 nm (unit: nm),
Y is the absolute value of the tilted angle of the slow axis of the positive C layer with respect to the light absorption axis of the polarizer (unit: °),
a is 13.666, and
b is −1.056, and
wherein the slow axis of the positive C layer is tilted at an angle of −14° to −1° or +1° to +14° with respect to a machine direction (MD) of the positive C layer, and the positive C layer is a stretched film and a stretched direction of the positive C layer is the machine direction (MD) of the positive C layer.

2. The optical laminate according to claim 1, wherein the tilted angle of the slow axis of the positive C layer with respect to the light absorption axis of the polarizer is in a range of −14° to +14°.

3. The optical laminate according to claim 1, wherein Y in Relation 1 is in a range of 0° to 14.5°.

4. The optical laminate according to claim 1, wherein the retardation layer is the positive C layer alone.

5. The optical laminate according to claim 1, wherein the positive C layer comprises a stretched non-liquid crystalline film.

6. The optical laminate according to claim 5, wherein the positive C layer comprises a stretched film comprising at least one resin selected from among a cellulose ester based resin, a polyester based resin, a cyclic polyolefin based resin, a polycarbonate based resin, a polyethersulfone based resin, a polysulfone based resin, a polyamide based resin, a polyimide based resin, a polyolefin based resin, a polyarylate based resin, a polyvinyl alcohol based resin, a polyvinyl chloride based resin, a polyvinylidene chloride based resin, and an acrylic based resin.

7. The optical laminate according to claim 1, wherein the positive C layer is stacked on the polarizer via a bonding layer.

8. The optical laminate according to claim 1, further comprising a protective layer stacked on a light exit surface of the polarizer.

9. The optical laminate according to claim 8, wherein a tilted angle of a slow axis of the protective layer with respect to the slow axis of the positive C layer is in a range of −14° to +14°.

10. The optical laminate according to claim 8, wherein the protective layer has an in-plane retardation of 3,000 nm or more at a wavelength of 550 nm.

11. An optical display apparatus comprising the optical laminate according to claim 1.

\* \* \* \* \*